Nov. 13, 1934.                W. BAUERSFELD                1,980,657
                APPARATUS FOR PLOTTING MAPS FROM PHOTOGRAPHS
                        Filed Feb. 16, 1933        2 Sheets-Sheet 1

Inventor:
Walter Bauersfeld

Patented Nov. 13, 1934

1,980,657

UNITED STATES PATENT OFFICE 1,980,657

APPARATUS FOR PLOTTING MAPS FROM PHOTOGRAPHS

Walther Bauersfeld, Jena, Germany, assignor to firm of Carl Zeiss, Jena, Germany Application February 16, 1933, Serial No. 657,047
In Germany February 22, 1932

3 Claims. (Cl. 33—20)

I have filed an application in Germany, February 22, 1932.

The invention concerns an apparatus for plotting maps from photographs taken from aircraft, in which a plurality of image projectors are displaceably mounted on a common supporting rod.

With the known apparatus of this kind, a supporting rod is to hold only two image projectors, as a consequence of which all image plates require to be changed subsequently to the evaluation of the image plates of these two projectors, this change entailing a troublesome reorientation of the image plates. To obtain an apparatus for the geodetical evaluation of a long strip of landscape photographed during one flight of the aircraft over this landscape, and with a view to avoiding that the evaluation is interrupted by any reorientation of photographs, the invention provides that the supporting rod carries three or more chamber systems for successively taken photographs of one and the same series and is universally adjustable together with these systems in such a manner that a plurality of photographs of the said series may be oriented at a time, the chamber systems being so disposed on the supporting rod that the photographs may be oriented relatively to the supporting rod also independently of each other in the known manner. It is advisable to provide in the chamber systems for a picture size inferior to that of the photographing cameras.

With a view to geodetically evaluate landscape series photographed in different lines of flight, it is advisable to use a plurality of such supporting rods and to mount each rod on a special frame, these frames being so constructed that they may be adjusted relatively to each other. When the chamber systems of all supporting rods have been correctly adjusted relatively to each other so as to enable the stereoscopic landscape image determined by the pictures of the chamber systems being given a definite orientation in space, it is advisable to mount all frames on one and the same supporting body, which is adjustable in order to provide for a common orientation of all chamber systems.

Figure 1:
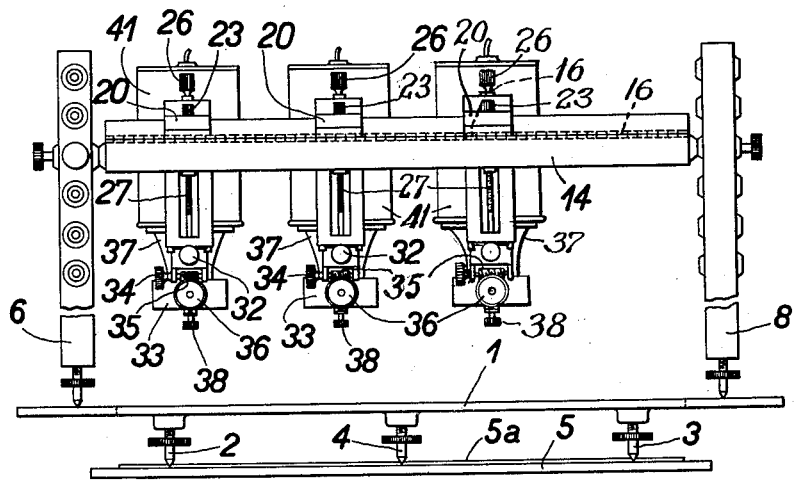
Figure 2:
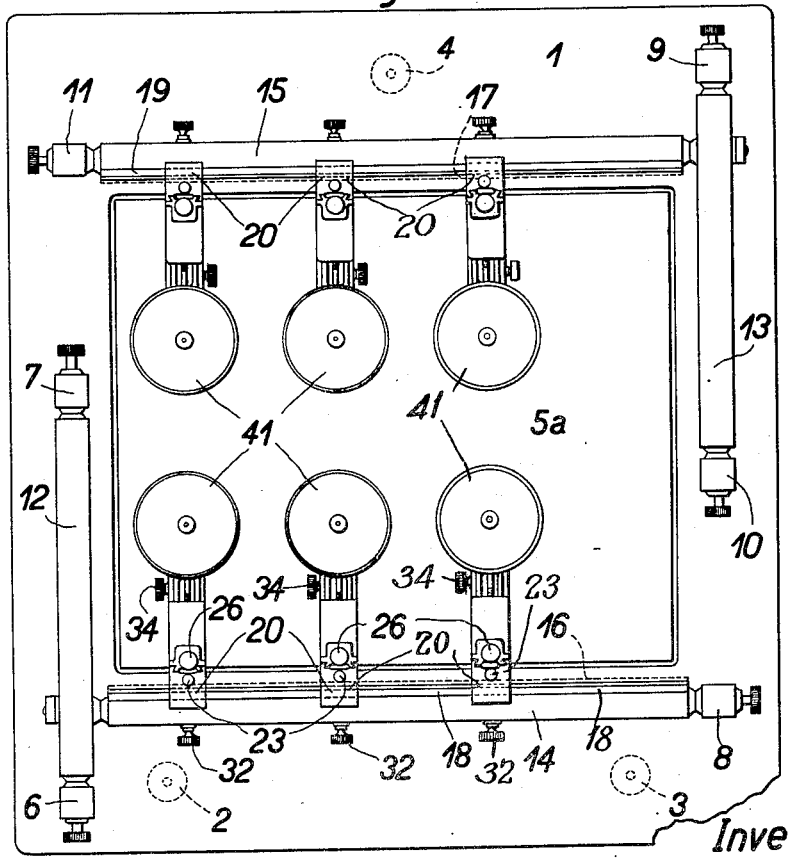
Figure 3:
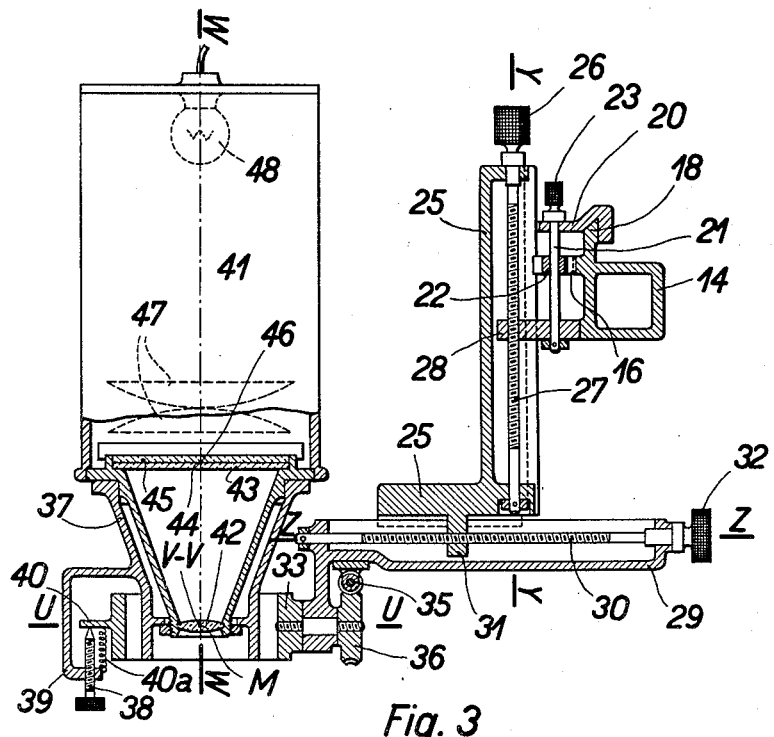
Figure 4:
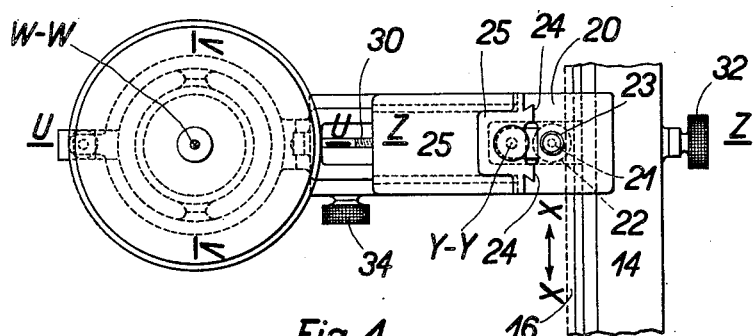

The accompanying drawings, which illustrate the invention, represent in Figures 1 and 2, in an elevation and in a plan view, respectively, a constructional example of an apparatus having two supporting rods for the projection chambers so as to permit to evaluate the image plates of a two-line flight. Figures 3 and 4 of the drawings show on an enlarged scale, in an elevation and in a plan view, respectively, the bearing for one projection chamber on the appertaining supporting rod.

A plane support plate 1 is adjustably so mounted by means of three feet 2, 3, 4 on a base plate 5 supporting a drawing sheet 5a, which represents a projection surface, that, by adjusting these feet, it may be given within certain limits any inclination relatively to the base plate 5. On the plate 1 rest two frames comprising three pillars 6, 7, 8 and 9, 10, 11, respectively. The pillars 6, 7 and 9, 10 are interconnected by transverse rods 12 and 13, respectively. The distance of these rods 12 and 13 from the base plate 1 may be varied by degrees by means of transverse bores in the pillars. The three pillars of each frame are rigidly connected by rods 14 and 15, respectively. The one ends of these rods 14 and 15 are connected to the appertaining transverse rods 12 and 13, respectively, and the other ends may be inserted into the transverse bores in the pillars 8 and 11, respectively. All these pillars rest on the support plate 1 by means of feet. By adjusting these feet, the height of the pillars relative to the plate 1 may be finely adjusted. The two rods 14 and 15 are provided in longitudinal direction with racks 16 and 17, respectively, and with knife-edges 18 and 19, respectively. Carriers 20 for projection chambers may be so placed anywhere on each of the two knife-edges that a pinion 22 rotatably mounted on each of the carriers 20 by means of a shaft 21 meshes with the appertaining racks 16 or 17. The pinion 22 may be rotated by means of a milled head 23 so as to adjust the carrier 20 on the appertaining supporting rod 14 or 15 in the direction X—X. On the carrier 20, in a dove-tail guide 24, a slide 25 is mounted for displacement in a direction Y—Y, which is at right angles to the said direction X—X. By means of a milled head 26 and a threaded spindle 27, whose axis lies in the direction of displacement Y—Y and which meshes with a female piece 28 of the carrier 20, the slide 25 may be displaced relatively to the carrier 20. On the slide 25 a slide 29 is mounted for displacement in a direction Z—Z at right angles to the directions X—X and Y—Y. On the slide 29 is rotatably mounted a threaded spindle 30 whose axis lies in the direction of displacement Z—Z and which meshes with a female piece 31 of the slide 25. By turning a milled head 32 and, consequently, the threaded spindle 30, the slide 29 may be displaced relatively to the slide 25. An annular body 33 is so mounted on the slide 29 that it may rotate about an axis U—U lying in the direction of displacement Z—Z. Rotating this annular body 33 relatively to the slide 29 is effected by means of a milled head 34 and a worm gear 35, 36. In the annular body 33, a bearing body 37 is mounted for rotation about an axis V—V intersecting the axis of rotation U—U at right angles, at the point M. Rotating the bearing body 37 relatively to the annular body 33 is effected by means of a screw 38 extending into a part 39 of the bearing body 37 and resting against an ear 40 fast with the annular body 33. A spring 40a between the part 39 and the ear 40 makes the screw 38 continuously touch the said ear 40. On the bearing body 37 a projection chamber 41 is so mounted as to rotate about an axis W—W intersecting the axis of rotation V—V at right angles, at the point of intersection M. The objective 42 of the chamber is given such a position that its optical axis coincides with the axis of rotation W—W and that its optical centre lies at the point of intersection M. A glass plate 43 is provided with a central mark 44 lying in the optical axis of the objective 42. The layer side of the picture plate 45 to be projected is to lie on this glass plate 43 in such a manner that that point 46 of the plate 45 which corresponds to the point of intersection of the axis of the objective of the photographic camera and the layer side of the plate in this camera coincides with the said central mark 44. 47 designates the condenser of the projection chamber 41, and 48 an incandescent lamp for illumination. According to the above, the projection chambers 41 may be displaced, relatively to the appertaining rods 14 and 15, in three directions X—X, Y—Y, Z—Z at right angles to each other and rotated about three axes U—U, V—V, W—W that are in pairs at right angles to each other, which means that any picture plate 45 may be given any desired position.

When images of photographs taken in series are to be evaluated, not only two, as assumed in the drawings for the sake of simplicity, but so many projection chambers 41 are to be suspended from the rod 14, which is longer than indicated in the drawings, as there are exposures in one series. These chambers are to be adjusted by displacement relative to the rod in such a manner that the points of intersection M have the same positions relatively to each other as the optical centres of the objectives of the photographic cameras at the time when the photographs were taken, and they are to be adjusted by rotation in such a manner that the picture plates have the same positions relatively to each other as the corresponding photographic plates at the time when they were exposed. These adjustments having been effected, the transverse rod 12 and the rod 14 are to be placed into those transverse bores in the pillars 6, 7, and 8 whose distances from the drawing sheet 5a correspond best to the altitude of flight at which the photographs were taken, and, further, by displacing the feet of the pillars 6, 7, and 8, the supporting rod 14 is to be finely adjusted relatively to the drawing sheet 5a.

When landscape photographs are to be evaluated which were taken in two different lines of flight, the chambers for projecting the pictures of the one and the other line of flight, respectively, are to be given the requisite positions relative to the rods 14 and 15, respectively. The frames 6, 7, 8 and 9, 10, 11 are now to be adjusted relatively to each other in such a manner that the rods 14 and 15, respectively, are in correct positions relative to each other. Finally, by displacing the feet 2, 3 and 4, the support plate 1 is to be so oriented that the chambers assume correct positions relative to the drawing sheet 5a.

I claim:

1. An apparatus for plotting maps from photographs taken from aircraft, comprising a projection surface and at least one supporting rod, means being provided for adjusting each of the supporting rods relatively to the said projection surface, at least three image projectors being movably mounted on each supporting rod.

2. An apparatus for plotting maps from photographs taken from aircraft, comprising a projection surface, a supporting body carrying a plurality of supporting rods, means for adjusting the said supporting body relatively to the said projection surface, and other means for adjusting each of the said supporting rods relatively to the said supporting body, at least three image projectors being movably mounted on each of the said supporting rods.

3. An apparatus for plotting maps from photographs taken from aircraft, comprising a projection surface, a supporting body carrying a supporting rod, means for adjusting the said supporting body relatively to the said projection surface, and other means for adjusting the said supporting rod relatively to the said supporting body, at least three image projectors being movably mounted on the said supporting rod.

WALTHER BAUERSFELD.